R. E. LEWIS & B. F. GIBBS.
TRANSMISSION LOCK.
APPLICATION FILED OCT. 25, 1915.
1,169,974.
Patented Feb. 1, 1916.
Fig.1.    Fig.2.
Fig.3.
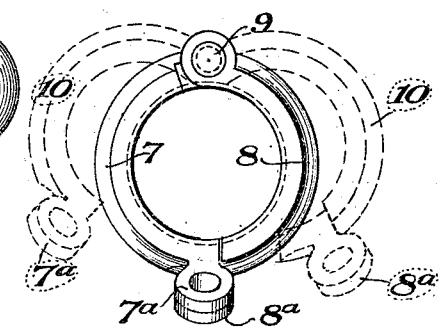
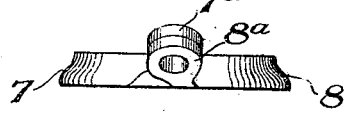
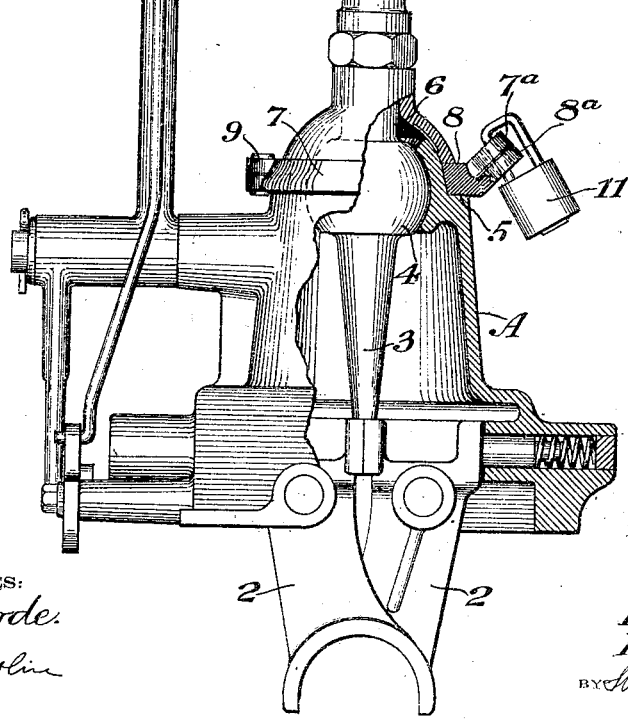
WITNESSES:
L. J. Forde.
B. M. Doolin
INVENTORS
Bert. F. Gibbs.
Roy. E. Lewis.
BY Strong & Townsend
ATTORNEYS

UNITED STATES PATENT OFFICE.

ROY E. LEWIS AND BERT F. GIBBS, OF SAN FRANCISCO, CALIFORNIA.

TRANSMISSION-LOCK.

1,169,974.  Specification of Letters Patent.  Patented Feb. 1, 1916.

Application filed October 25, 1915. Serial No. 57,779.

*To all whom it may concern:*

Be it known that we, ROY E. LEWIS and BERT F. GIBBS, citizens of the United States, residing in the city and county of San Francisco and State of California, have invented new and useful Improvements in Transmission-Locks, of which the following is a specification.

This invention relates to means particularly intended for use in connection with automobiles to lock the gear shifting lever against movement when placed in neutral or inoperative position.

The object of the present invention is to provide a simple, substantial, practical lock of this character which is strong and durable in its construction and inexpensive of manufacture and application to a car and which may be quickly applied or removed by the driver from his seat in the machine. Further objects will hereinafter appear.

The invention consists of the parts and the construction and combination of parts, as hereinafter more fully described and claimed, having reference to the accompanying drawings, in which—

Figure 1 is a side elevation of the gear shifting lever partly in section, said view also shows a part of the transmission cover and the shifter forks. Fig. 2 is a plan view of the locking ring. Fig. 3 is an edge view of same.

Referring to the drawings in detail, A indicates the transmission cover; 2 the shifter forks; and 3 the gear shifting lever. The lever is in this instance mounted on a ball joint 4 and is therefore, capable of being rocked in any direction. The upper end of the transmission cover forms a seat for the ball and is provided on its exterior surface with an annular shoulder 5.

Secured on the lever 3 just above the ball joint is a spherical-shaped cover 6, which prevents admission of grit and dirt into the ball joint. Sufficient space is left between the lower edge of the cover 6 and the shoulder 5 to permit the lever to be rocked in the direction desired, when gear shifting operations take place and this space is adapted to receive the locking ring, shown in Figs. 2 and 3, for the purpose of locking the lever 3 against movement.

The locking ring proper is divided in two halves, such as indicated at 7 and 8, which are pivotally connected, as at 9 to permit the segments of the ring to be opened out into the dotted line position, shown at 10 and formed on each ring section on the side opposite to the pivot 9, is a pair of perforated lugs 7ª and 8ª which are adapted to receive a standard lock 11, to prevent the ring sections from being opened out when in position on the transmission cover, as shown in Fig. 1. The thickness of each ring is such that it will fill the space formed between the lower edge of the cover 6 and the annular shoulder 5.

In operation when it is desired to lock the lever in its neutral inoperative position, it is only necessary to place the locking ring upon the shoulder 5 and swing the sections together about pivot 9 until the lugs 7ª and 8ª register. The hasp of an ordinary lock, such as shown at 11 is then passed through the registering perforated lugs and is then snapped into the lock. The lever 3 is in this manner locked against movement, as the lower edge of cover 6 engages with the face of the ring when it is attempted to rock the lever in any direction. It is, therefore, impossible to operate the lever until the locking ring has been removed and as this can only be accomplished by the individual who retains the key for the lock 11, it can therefore easily be seen that unauthorized individuals would be thwarted in their attempt.

The locking ring as a whole is simple, durable and strong in construction and can not be removed without releasing the lock 11. It can furthermore, be quickly applied and removed by the driver, as it is within convenient reach from the seat of the machine, and is therefore, of little inconvenience to any one who finds such a device necessary.

The materials and finish of the locking ring may otherwise be such as the judgment and experience of the manufacturer may dictate.

We wish it understood that various changes in form, proportions and minor details of construction may be resorted to within the scope of the appended claims, and that we do not wish to limit ourselves to the specific design and construction here shown.

Having thus described our invention, what we claim and desire to secure by Letters Patent is—

1. A lever having a globular fulcrum, and a socket within which the lever is universally turnable, a casing inclosing the socket and having an annular shoulder, a cover cap fixed to and movable with the lever, said cap forming an open annular channel between it and the casing shoulder, and a ring adapted to fit said channel and prevent movement of the lever.

2. A casing having a globular socket at the top, and an annular shoulder surrounding the socket, a lever extending into the casing and having a globular fulcrum turnable in the socket, and a cover cap fixed to the lever above the fulcrum and forming with the casing shoulder an open channel, a ring composed of two halves hinged together and capable of fitting into and closing said channel, said ring having perforated lugs opposite the hinge and adapted to receive a lock.

In testimony whereof we have hereunto set our hands in the presence of two subscribing witnesses.

ROY E. LEWIS.
BERT F. GIBBS.

Witnesses:
W. W. HEALY,
M. E. EWING.